United States Patent [19]
Young

[11] 3,865,408
[45] Feb. 11, 1975

[54] POSITIVE LOCKING SEALING CONNECTOR FOR WELL PIPE

[75] Inventor: Carter R. Young, Lewisville, Tex.

[73] Assignee: Otis Engineering Corporation, Dallas, Tex.

[22] Filed: Nov. 1, 1972

[21] Appl. No.: 302,659

[52] U.S. Cl............................ 285/3, 285/24, 285/317
[51] Int. Cl.............................................. F16l 35/00
[58] Field of Search......... 285/3, 4, 18, 24, 27, 317, 285/45, 341, 342, 145, 146, 147, 148; 294/86.26, 86.3, 102 R; 169/98

[56] References Cited
UNITED STATES PATENTS

| | | | |
|---|---|---|---|
| 2,737,247 | 3/1956 | Baker et al. | 285/18 X |
| 3,011,806 | 12/1961 | Allen et al. | 285/147 |
| 3,278,219 | 10/1966 | Elliston | 294/102 R |
| 3,334,923 | 8/1967 | Putch | 285/18 |
| 3,334,924 | 8/1967 | Todd | 285/18 |
| 3,711,123 | 1/1973 | Arnold | 285/18 |

Primary Examiner—Dave W. Arola

[57] ABSTRACT

An overshot connector having positively expanded and positively locked packing assembly means for sealing between two sections of pipe in a well bore. Means is provided for guiding the upper end of the lower section of pipe being connected through the sealing assembly means of the connector or overshot, and a positive latch holding the sealing assembly means in expanded sealing position is provided, which also positively locks the two sections of pipe together against disconnection.

The locking and sealing are effected in both directions of flow and without rotation of the pipe in the well, by a simple longitudinal relative movement of the pipe strings with respect to each other.

7 Claims, 8 Drawing Figures

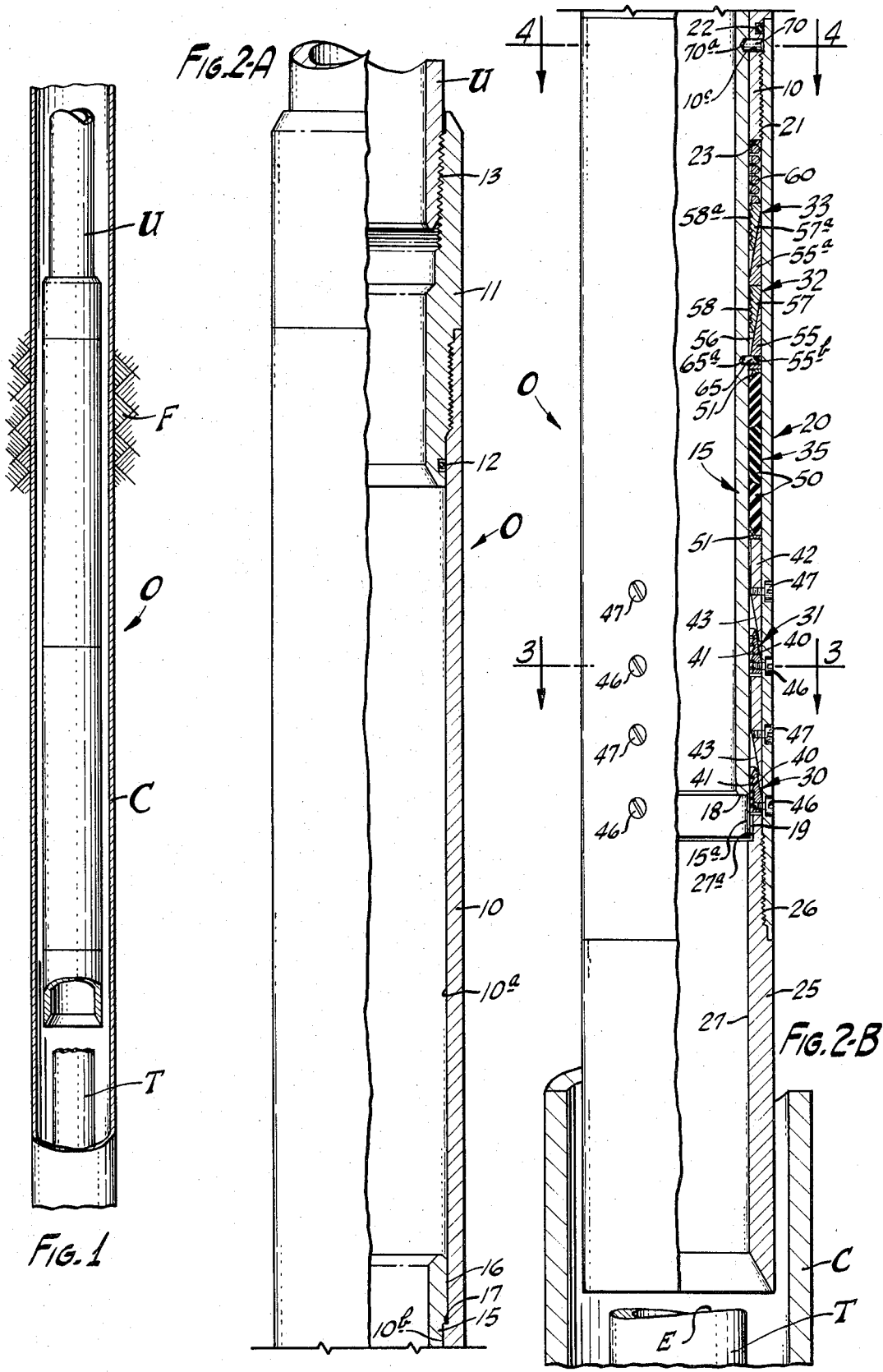

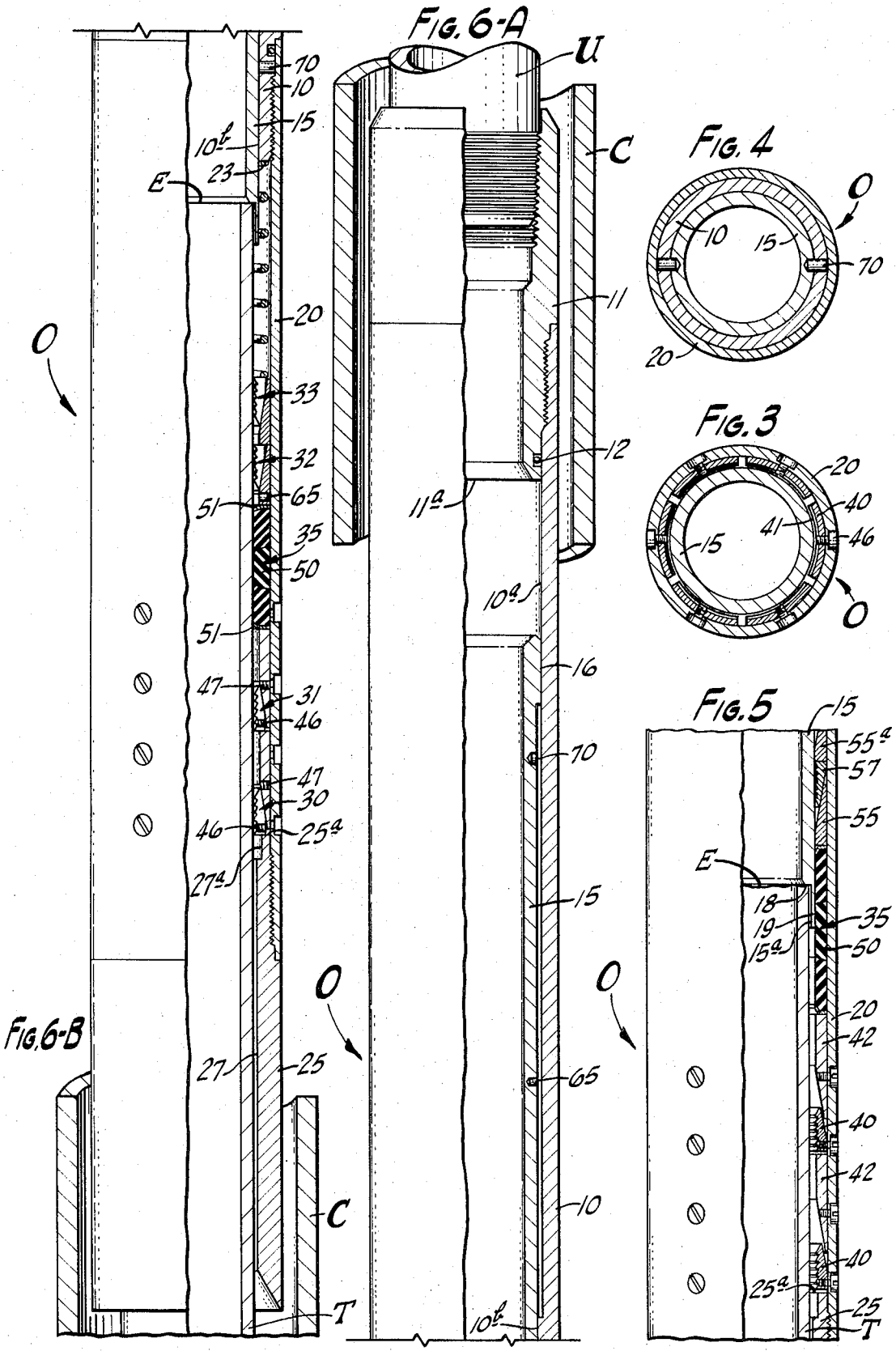

POSITIVE LOCKING SEALING CONNECTOR FOR WELL PIPE

This invention relates to well tools, and more particularly to positive locking and sealing connectors for well pipes, such as pack off overshots for connecting sections of well pipe in longitudinal flow communicating alignment with one another.

An important object of the invention is to provide a connector device of the character described wherein the connection may be made by a simple longitudinal movement of the pipes relative to each other to effect a positive seal in both directions between the pipes and a positive lock against disconnection of the pipes from each other.

A particular object of the invention is to provide a connector tool of the character described which is particularly adapted for use in working over wells for connecting an upper flow conductor to a lower portion of a flow conductor in place in the well, from which the upper portion has been removed from connection therewith, to re-establish a continuous flow path from the lower conductor portion through the added upper conductor portion to the surface.

Still another object of the invention is to provide a sealing connector tool of the character set forth which is adapted for use with flow conductors which have been parted by cutting mechanically or chemically or the like in which the cut end is protected as it is moved through the sealing assembly of the connector device.

A further object is to provide a sealing connector of the character discussed which includes a guide protector thimble structure which covers the roughened or ragged upper cut-off end of a conductor left in place in the well to guide the same through the latching and sealing assemblies of the connector to position a portion of the conductor within the latching and sealing assemblies without damaging such assemblies.

Still a further important object of the invention is to provide in a sealing connector of the character described means for indicating that the rough cut-off upper end of the pipe or conductor in place in the well, to which an upper section is to be connected by the connector, has passed through the latching mechanism and packing assembly.

A further object of the invention is to provide guide means on the connector member for guiding the roughened cut-off upper end of the pipe or conductor left in place in the well into the bore of the connector member and into the thimble by means of which the roughened cut-off upper end is guided past the seal and latching members.

BRIEF DESCRIPTION OF THE DRAWINGS

Additional objects and advantages of the invention will be readily apparent from the reading of the following description of a device constructed in accordance with the invention, and reference to the accompanying drawings thereof, wherein:

FIG. 1 is a schematic view, partly in elevation and partly in section, of a well having a casing therein with a cut-off lower section of flow conductor or pipe in place in the well, showing a sealing connector device constructed in accordance with the invention being installed therein for connecting an upper section of pipe to the lower section;

FIGS. 2-A and 2-B are enlarged longitudinal views, partly in elevation and partly in section, of a connector device constructed in accordance with the invention showing the same being lowered in a well into engagement with the upper end of a cut-off section of pipe therebelow;

FIG. 3 is a horizontal cross-sectional view taken on the line 3—3 of FIG. 2-B;

FIG. 4 is a horizontal cross-sectional view taken on the line 4—4 of FIG. 2-B;

FIG. 5 is a fragmentary vertical sectional view of the latching and sealing portion of the connector device showing the upper end of the pipe left in place in the well being guided therethrough by the guide thimble of the connector device; and, FIGS. 6-A and 6-B are longitudinal views similar to FIGS. 2-A and 2-B showing the connector device connected to the upper end of the pipe left in place in the well.

DESCRIPTION OF THE INVENTION

In the drawings, FIG. 1, a well casing C is shown positioned in a well bore extending through an earth formation F to a desired depth. Within the casing is a flow conductor or tubing string T which is shown to be cut off at its upper end below the surface of the well for any reason in preparation for re-working the well flow system in some manner. An upper tubing string U is shown being lowered in the casing C to be connected to the upper end of the lower cut-off tubing string T. A sealing connector member or overshot O is provided on the lower end of the upper tubing string U and is adapted to telescope over the upper end of the lower tubing string section T and connect the lower tubing string T with the upper tubing string U in a locked positively sealed condition.

Details of the overshot O are shown in FIGS. 2-A and 2-B, wherein an elongate upper sleeve 10 is connected at its upper end to a sub 11 which has internal threads at the upper end of its bore for receiving the lower end of the upper tubing string U. The sleeve 10 is threaded onto the reduced lower end of the sub 11 and an O-ring 12 is positioned in a recess in the exterior of the lower end of the sub below the threads for sealing between the sleeve 10 and the sub. The pipe threads 13 provide a seal between the sub and the upper tubing string U. An elongate internal guiding thimble sleeve 15 has an enlarged head 16 at its upper end which fits within the bore 10a of the upper sleeve 10, and a shoulder 17 between the upper bore 10a and the reduced lower bore 10b provides a stop engageable by the head 16 for limiting downward movement of the guide thimble sleeve 15 with respect to the sleeve 10. The lower end of the sleeve 10 has its exterior reduced and threaded into a latching and sealing body sleeve member 20 which is threaded onto the reduced lower end of the sleeve 10 by threads 21, and an O-ring 22 is disposed in an external annular groove on the reduced lower end of the sleeve 10 and seals between the sleeve 10 and the sleeve 20. A guide shoe 25 which has its reduced upper end provided with threads which engage with threads in the lower end of the housing sleeve 20 to provide a threaded connection 26. The bore 27 of the guide shoe is beveled downwardly and outwardly at its lower end to provide a guiding surface 28 for guiding the upper end of the lower tubing section T into the bore of the shoe and into the bore of a thimble 15a at the lower end of the thimble sleeve 15. The bore 15a is enlarged to conform to the bore 27 of the guide shoe 25 and to provide a downwardly facing stop shoulder 18 near the lower end of the thimble sleeve 15 for engagement with the rough or coarse cut-off upper end of the lower tubing section T in place in the well, whereby the cut-off edge is guided into the thimble socked or bore 15a into engagement with the shoulder 18 and shielded or covered by the depending skirt 19 around the thimble bore 15a so as to be enclosed within said skirt.

Within the bore of the body sleeve 20 are provided a plurality of sets of lower locking slip assemblies 30 and 31, and a plurality of sets of upper locking slip assemblies 32 and 33, respectively, located on longitudinally opposite sides of a sealing ring assembly 35. The lower slip assembly 30 comprises an annulus of segmental slip members 40 having downwardly facing gripping teeth 41 on their inner surfaces and disposed to be expanded into gripping engagement with the tubing T by an annular wedge member 42 having a downwardly and outwardly inclined wedging surface 43 in its bore to engage a complementary upwardly and inwardly inclined wedging surface on each of the slip segments 40. Similarly, the upper slip assembly 31 is an annulus formed of a plurality of segments 40 identical to the segments of the assembly 30 and given the same identifying numbers, and an expander wedge sleeve 42 also identical to that of the assembly 30. The slip segments are positively held in the outer positions shown in FIG. 2-B, by shear screws 46 which prevent the segments from moving toward the center of the sleeve into gripping engagement with the pipe extending therethrough. Also, the wedge members 42 are held against longitudinal movement by shear screws 47 extending through the wall of the housing sleeve 20 and threaded into the wedge members, so that the wedges and slips are positively held against premature movement into latching position until such movement is desired, as will be explained hereinafter.

Above the upper wedge member 42 of the upper slip assembly 31 is a sealing assembly 35, which is shown to be comprised of a set of a plurality of rings of resilient mechanically expandable packing 50 having antiextrusion rings or retainers 51 at its opposite ends. The sealing rings 50 engage loosely about the exterior of the thimble guide sleeve 15 and are slidable therealong as will hereinafter be more fully explained.

Above the sealing assembly 35 the lower of the plurality of upper locking assemblies 32 and 33 comprises first a wedge member 55 having an upwardly and outwardly inclined wedging surface 56 thereon which engages over the exterior substantially frusto-conical surfaces of the annulus of segmental gripping slips 57 having upwardly facing internal gripping teeth 58 thereon. The upper end of the slips 57 engage the lower end of a wedge member 55a substantially identical to the wedge member 55 and engaging over the frusto-conical exterior surface of the annulus of segmental gripping slips 57a of the upper assembly 33 which also have upwardly facing internal gripping teeth 58a thereon. The upper ends of the upper slips 57a abut the lower end of a helical coiled spring 60 confined between the slips and the lower end 23 of the sleeve 10, whereby the spring biases the slips 57a and 57 downwardly toward the packing assembly 35.

As assembly pin 65 extends through an aperture 55b in the lower wedge member 55 and into an aperture 65a in the exterior of the thimble sleeve 15, and is utilized to hold the slip assemblies and springs in place on the exterior of the thimble sleeve 15 when the device is assembled. A shear pin 70 extends through an aperture 10c in the reduced lower portion of the sleeve 10 and into an opening 70a in the thimble sleeve 15 and positively holds the thimble sleeve in its lower position shown in FIGS. 2-A and 2-B. The shear pin 70 therefore holds the thimble sleeve 15 with the skirt 19 at its lower end disposed in the enlarged upper bore 27a of the guide shoe 25, as shown in FIG. 2-B in a position to receive the roughened cut-off upper end E of the tubing section T in place in the well as it enters the bore of the overshot device or connector.

With the guide sleeve 15 in the position shown in FIGS. 2-A and 2-B, the head 16 at the upper end of the thimble sleeve 15 engages the shoulder 17 at the upper end of the reduced bore 10b in the sleeve 10, and the skirt 19 of the thimble sleeve is disposed in the bore 27a of the guide shoe 25. In this position, the slips assemblies 30, 31, 32 and 33 and the packing assembly 35 are confined in the annular space between the exterior of the thimble sleeve 15 and the bore wall of the housing or body sleeve 20 and are not subjected to engagement by the tubing T or any other tool or instrument passing through the overshot assembly, and therefore remain undisturbed until they are intentionally actuated as will now be described.

When the overshot tool or connector member O is lowered into the casing C, as shown in FIG. 1 and FIG. 2, until the upper end of the tubing section T in place in the well enters the bore 27 of the guide shoe 25, the overshot will move downwardly over the upper end E of the tubing section until such upper end engages the shoulder 18 in the bore 15a of the thimble skirt 19. When such engagement takes place, a downward force applied to the upper tubing section U will shear the pin 70 and permit the thimble sleeve 15 to be moved upwardly in the sleeve 10 and through the latching assembly and packing assemblies in the body sleeve 20, as shown in FIG. 5. The skirt 19 of the thimble sleeve will enclose the roughened cut-off upper end of the tubing T, as shown in FIG. 5, so that the upper end E or any cutting edges thereon are confined within the skirt and guided past the slips, expander sleeves and packing rings 50 until the upper end E of the tubing section T is disposed above the uppermost set 33 of the slip or gripping assemblies and the upper end of the thimble sleeve 15 is in engagement with the downwardly facing lower end 11a of the sub 11 in the upper end of the bore 10a of the sleeve 10. At this time, the upper end E of the tubing section T is substantially above the uppermost set of slips 33 and above the helical coiled spring 60 and within the lower portion of the bore 10b of the sleeve 10. At this time, the exterior surface of the tubing section T is well within the plurality of sets of upper gripping members 32 and 33, whereby an upward pull on the upper tubing string U will lift the sub 11 and the sleeve 10, and the housing sleeve 20 connected thereto, whereupon the upper sets of gripping members 32 and 33 are wedged into gripping engagement with the exterior of the tubing section T below its upper end E as shown in FIG. 6-B. A continued upward pull on the upper tubing U will lift the housing sleeve 20 and the lower slips 30 and 31 therewith, and will compress the packing rings 50 of the packing assembly 35 into tight positive sealing engagement with the exterior of the tubing section T to form a positively expanded seal between the housing sleeve 20 and the exterior of the tubing section T. Continued upward force applied through the sleeve 20 will shear screws 46 and 47 and permit the gripping slips 40 of the lower gripping assemblies 30 and 31 to be moved along the wedge surfaces 43 of the wedging members 42 into tight gripping engagement with the exterior of the tubing section T to prevent downward movement of the assemblies and the packing on the exterior of the tubing.

Thus, the housing 20 is positively locked to the lower tubing section T by the gripping assemblies 30, 31, 32 and 33, since the engagement of the upper end of the guide shoe 25 with the lower slip members 40 limits upward movement of the housing sleeve 20 with respect to the tubing section T. At the same time, the sealing rings 50 are held in positively expanded sealing engagement with the exterior of the tubing T and the anti-extrusion members 51 prevent flow of the sealing ring material therepast and confine it between the upper and lower anti-extrusion devices in sealing engagement with the bore wall of the housing sleeve 20 and the exterior of the tubing section T.

It will therefore be seen that the sealing overshot or connector member O provides a positively expanded positively locked seal between the upper tubing string section U and the lower tubing section T, and so establishes a sealed flow communication between the lower tubing section T and the upper tubing section U which will not accidentally release, but is positively held in effective sealing connecting condition at all times.

It will also be seen that the roughened cut-off upper end E of the lower tubing section T is guided past the slips or locking members and past the sealing assembly seal rings 50 without being permitted to engage and cut or otherwise damage the seal members or the gripping elements. Also, it will be seen that the guide shoe 25 provides means for guiding the upper end of the pipe into the bore 15a of the thimble skirt 19, and that the beveled surface 28 may form or swage any roughened projecting portions of the upper cut-off end E of the pipe T into condition to enter the thimble bore 15a and be confined by the shirt 19. Also, the slips or gripping members 30, 31, 32 and 33 are positively held in inoperative position until the pipe has been properly located within the overshot connector member, at which time the gripping members are activated to engage them with the pipe to expand or compress the packing to deform it into sealing engagement with the exterior of the tubing T and to positively secure the overshot connector member on the upper end of the tubing section. Thus, the upper tubing section U is positively connected in sealed flow communication with the lower tubing section T.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A sealing connector for well pipes comprising: an elongate tubular housing having means at one end thereof for connection to a first pipe and having a bore for receiving the end of a second pipe movable longitudinally into said bore; an annular sealing assembly disposed in the bore of said housing; a plurality of sets of gripping members in the bore of the housing, at least one set at each of the longitudinally opposite ends of said sealing assembly, the gripping members being disposed to lockingly engage said second pipe when extending through said sealing assembly and gripping members to hold the sealing assembly compressed therebetween in sealing engagement with said second pipe and said housing and to positively lock said housing on said second pipe; a guide sleeve movable longitudinally in the housing with respect to the sealing assembly and gripping members for guiding the end of said second pipe past said gripping members and sealing assembly in the bore of the housing and having thimble means thereon telescoping over the end of said second pipe to cover and guide said end through the locking members and sealing assembly without damaging the same to position the second pipe within the gripping members and sealing assembly for engagement by the gripping members and sealing assembly.

2. A sealing connector of the character set forth in claim 1 wherein the guide sleeve extends through the sealing assembly and gripping members and securing means releasably secures said guide sleeve to the housing to hold said sleeve in such position, said securing means being releasable for movement of said sleeve longitudinally through the sealing assembly and gripping members by the engagement of the second pipe with said thimble means on said guide sleeve.

3. A sealing connector for well pipes comprising: an elongate tubular housing having means at one end thereof for connection to a first pipe and having a bore for receiving the end of a second pipe; an annular sealing assembly disposed in the bore of said housing; a plurality of sets of gripping members in the bore of the housing, at least one first set at one end of said sealing assembly and at least one second set at the longitudinally opposite end of said sealing assembly, the gripping members being disposed to lockingly engage said second pipe when extending through said sealing assembly and gripping members to hold the sealing assembly compressed therebetween in sealing engagement with said second pipe and said housing and to positively lock said housing on said second pipe; a guide sleeve initially extending through the sealing assembly and gripping members and movable longitudinally in the housing with respect to the sealing assembly and gripping members for guiding the end of said second pipe past said gripping members and sealing assembly in the bore of the housing; and thimble means on said guide sleeve slipably engaging over the end of said second pipe for shielding the end of said second pipe to guide said end through the locking members and sealing assembly without damaging the same to position the second pipe within the gripping members and sealing assembly for engagement by the gripping members and sealing housing.

4. A sealing connector of the character set forth in claim 3 including: releasable securing means securing said guide sleeve in said initial position extending through the sealing assembly and gripping members and releasable to permit said sleeve to move longitudinally in the housing when said second pipe is engaged in said thimble means.

5. A sealing connector of the character set forth in claim 3 including: first means securing the first gripping means on one side of the sealing assembly releasably to the housing in non-gripping position; second means securing the second gripping means on the opposite side of the sealing assembly releasably to the guide sleeve to limit movement thereof toward the sealing assembly; said second gripping means secured to said guide sleeve being releasable therefrom upon longitudinal movement of the guide sleeve in the housing by the second pipe to free said second gripping means for movement into gripping engagement with said second pipe when said pipe extends therethrough; and resilient means in said housing engaging said second gripping means to move said second means to gripping engagement with said pipe when released from said guide sleeve.

6. A sealing connector of the character set forth in claim 5, wherein the first means securing the first gripping means to the housing in non-gripping position is releasable upon expansion of the sealing means to move said first gripping means into gripping engagement with said second pipe to coact with said first gripping means to hold said sealing means in expanded sealing position with the said second pipe and said housing and to hold said second pipe in said housing.

7. A device of the character set forth in claim 6 including: stop means on said housing and said guide sleeve coengageable to limit longitudinal movement of the guide sleeve in the housing to position the second pipe within the sealing assembly and gripping means for engagement thereby.

* * * * *